US010859378B2

(12) United States Patent
Hamze El Badaoui et al.

(10) Patent No.: US 10,859,378 B2
(45) Date of Patent: Dec. 8, 2020

(54) METHOD FOR ESTIMATING SCATTERING COEFFICIENTS OF A LASER GYRO IN OPERATION AND ASSOCIATED GYROSCOPIC SYSTEM

(71) Applicants: THALES, Courbevoie (FR); Association pour la Recherche et le Développement de Méthodes et Processus Industriels, ARMINES, Paris (FR)

(72) Inventors: Noad Hamze El Badaoui, Bourg la Reine (FR); Pierre Rouchon, Meudon (FR); Gilles Feugnet, Palaiseau (FR); Sylvain Schwartz, Palaiseau (FR); Philippe Martin, Paris (FR)

(73) Assignees: THALES, Courbevoie (FR); ASSOCIATION POUR LA RECHERCHE ET LE DÉVELOPPEMENT DE MÉTHODES ET PROCESSUS INDUSTRIELS-ARMINES, Paris (FR)

( * ) Notice: Subject to any disclaimer, the term of this patent is extended or adjusted under 35 U.S.C. 154(b) by 385 days.

(21) Appl. No.: 15/453,818

(22) Filed: Mar. 8, 2017

(65) Prior Publication Data
US 2017/0268881 A1    Sep. 21, 2017

(30) Foreign Application Priority Data

Mar. 18, 2016    (FR) ..................................... 16 00449

(51) Int. Cl.
*G01C 19/66*    (2006.01)
(52) U.S. Cl.
CPC ......... *G01C 19/661* (2013.01); *G01C 19/664* (2013.01)

(58) Field of Classification Search
CPC .... G01C 19/661; G01C 19/664; G01C 19/66; G01C 19/662; H01S 3/083
(Continued)

(56) References Cited

U.S. PATENT DOCUMENTS

| 4,551,021 A |   | 11/1985 | Callaghan et al. |
| 4,715,713 A | * | 12/1987 | Hutchings ............ G01C 19/665 356/459 |

(Continued)

OTHER PUBLICATIONS

Fan. Zhenfang, et al., "Online effective backscattering estimation for ring laser gyro," Chinese Optics Letters, May 10, 2012, pp. 051404-1 to 051404-3.*

(Continued)

*Primary Examiner* — Alexander Satanovsky
*Assistant Examiner* — Jeffrey P Aiello
(74) *Attorney, Agent, or Firm* — BakerHostetler (57) ABSTRACT

An iterative method for determining scattering coefficients of the cavity of a laser gyro in operation supporting two counter-propagating modes, comprises steps of: determining a set of variables dependent on characteristic physical quantities of the laser gyro, one reference variable per dependency relationship being selected from the variables; measuring values of the characteristic physical quantities of the laser gyro in operation; determining measured values of the variables; estimating, via an iterative method, estimated values of the coefficients minimising a discrepancy between the measured values of the reference variables and estimated values of the reference variables, which are estimated from the values of the coefficients and the measured values of the variables other than the reference variables; and determining estimated values of the scattering coefficients from the estimated values of the coefficients.

11 Claims, 7 Drawing Sheets

(58) Field of Classification Search
USPC .......... 356/459, 469, 471; 372/94; 702/141, 702/189
See application file for complete search history.

(56) References Cited

U.S. PATENT DOCUMENTS

| | | | | |
|---|---|---|---|---|
| 4,807,998 | A * | 2/1989 | Weber | G01C 19/665 356/472 |
| 5,251,230 | A * | 10/1993 | Lai | G01C 19/665 372/12 |
| 5,363,463 | A * | 11/1994 | Kleinerman | G01J 5/08 250/227.11 |
| 5,442,442 | A | 8/1995 | Kanegsberg et al. | |
| 7,884,933 | B1 * | 2/2011 | Kashyap | G01N 21/474 356/338 |
| 8,437,005 | B2 * | 5/2013 | Digonnet | G01C 19/721 356/460 |
| 8,494,829 | B2 * | 7/2013 | Teixeira | A61B 5/0205 600/324 |
| 9,212,911 | B1 * | 12/2015 | Tal | G01C 19/64 |
| 2008/0088849 | A1 * | 4/2008 | De Lega | G01B 9/02044 356/450 |
| 2011/0286000 | A1 * | 11/2011 | Hu | G01N 21/4738 356/445 |
| 2014/0335887 | A1 * | 11/2014 | Liu | H04W 64/00 455/456.1 |
| 2014/0336956 | A1 * | 11/2014 | Patti | F02D 41/22 702/50 |

OTHER PUBLICATIONS

Fan. Zhenfang, et al., "Dynamic lock-in compensation for mechanically dithered ring laser gyros," Chinese Optics Letters, Jun. 10, 2012, pp. 061403-1 to 061403-3.*

Fan. Zhenfang, et al., "Online effective backscattering estimation for ring laser gyro," Chinese Optics Letters, May 10, 2012, pp. 051404-1 to 051404-3 (Year: 2012).*

Fan. Zhenfang, et al., "Dynamic lock-in compensation for mechanically dithered ring laser gyros," Chinese Optics Letters, Jun. 10, 2012, pp. 061403-1 to 061403-3 (Year: 2012).*

Zhenfang Fan et al., "Online effective backscattering estimation for ring laser gyro," Chinese Optics Letters, vol. 10, No. 5, May 10, 2012, pp. 051404-1-051404-3.

Zhenfang Fan et al., "Dynamic lock-in compensation for mechanically dithered ring laser gyros," Chinese Optics Letters, vol. 10, No. 6, Jun. 10, 2012, pp. 061403-1-061403-3.

* cited by examiner

METHOD FOR ESTIMATING SCATTERING COEFFICIENTS OF A LASER GYRO IN OPERATION AND ASSOCIATED GYROSCOPIC SYSTEM

CROSS-REFERENCE TO RELATED APPLICATIONS

This application claims priority to foreign French patent application No. FR 1600449, filed on Mar. 18, 2016, the disclosure of which is incorporated by reference in its entirety.

FIELD OF THE INVENTION

The invention relates to the field of laser gyros, and more particularly to a method for estimating certain parameters of a laser gyro allowing the measurements taken with the laser gyro to be improved.

BACKGROUND

Laser gyros consist of a ring laser in which two counter-propagating modes, designated by the letters CW (for clockwise) and CCW (for counterclockwise), propagate. When this device is rotated at an angular speed $\dot{\theta}$, the counter-propagating modes are shifted out of phase by an amount $\varphi$ by the Sagnac effect, causing a difference between their eigenfrequencies and hence a difference between the emission frequencies of the laser.

For an ideal laser gyro, the relationship between the phase difference $\varphi$ between the two modes and the speed of rotation $\dot{\theta}$ is given by the formula:

$$\dot{\varphi}(t) = \frac{4A\omega}{c^2}\dot{\theta} = \kappa\dot{\theta} \quad (1)$$

where A is the area of the cavity of the laser and $\omega$ its angular frequency in rd/s.

$\kappa$ is called the gain or scale factor of the gyroscope.

The Sagnac phase shift $\varphi$ may be measured by combining, outside the cavity, by interferometry, the beams of the counter-propagating modes, in a detector (typically a photodiode). Assuming that the intensities remain stable, the beat signal received by the photodiode is a sinusoid at a frequency equal to the frequency difference between the counter-propagating modes, i.e. the Sagnac frequency. The beat signal therefore delivers information on the speed of rotation of the laser. However, with a single photodiode it is not possible to tell the difference between two directions of rotation, and this is why two photodiodes are used. They are placed such that their signals are in phase quadrature one with respect to the other, the phase of the interference pattern then being slightly different for each thereof. It is then possible to obtain the direction of movement of the interference fringes and therefore the direction of rotation.

Figure 1:
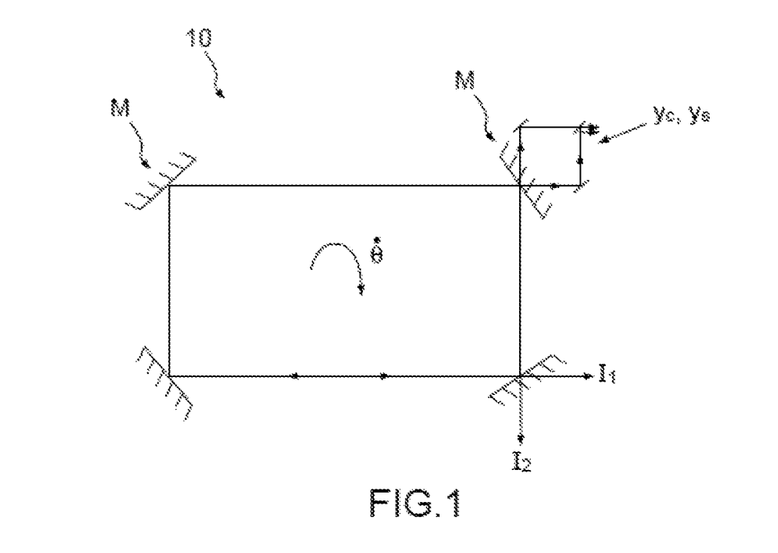
FIG. 1, which was mentioned above, schematically illustrates a laser gyro in which the respective intensities hand $I_2$ of the two modes are measured on exiting the cavity and the two beat signals $y_c$ and $y_s$ are measured in phase quadrature.

FIG. 1 schematically illustrates a laser gyro 10 in which the respective intensities $I_1$ and $I_2$ of the two modes are measured on exiting the cavity and in which the two beat signals $y_c$ and $y_s$ are in phase quadrature:

$$y_c = I_1 + I_2 + 2\sqrt{I_1 I_2} \cos(\varphi + \gamma)$$

$$y_s = I_1 + I_2 + 2\sqrt{I_1 I_2} \sin(\varphi + \gamma) \quad (2)$$

where $\varphi$ is the phase shift induced by the Sagnac effect; and $\gamma$ is the phase shift due to the position of the measurement in the laser loop.

Below, by "measured quantities Gm" what is meant is the measured data:

$I_1$, $I_2$ $y_c$ and $y_s$.

Typically, as is known, from the measured quantities Gm, the phase $\varphi$ is obtained by "rectification" and then the velocity of rotation.

Integration of equation (1) gives:

$$\varphi(t) - \varphi(0) = \kappa[\theta(t) - \theta(0)]$$

Let the measurement function K ($I_1$, $I_2$, $y_c$, $y_s$, t) be such that:

$$K(I_1, I_2, y_c, y_s, t) = \arctan\left(\frac{\frac{y_s - I_1 - I_2}{2\sqrt{I_1 I_2}}}{\frac{y_c - I_1 - I_2}{2\sqrt{I_1 I_2}}}\right) = (\varphi(t) + \gamma)[2\pi] \quad (3)$$

For the sake of simplicity, let $K(I_1, I_2, y_c, y_s, t) = K(t)$.

For a gyroscope rotating at an angular velocity of rotation $\dot{\theta}(t)$ between two times $t_1$ and $t_2$, an estimation of the total angular rotation is given by:

$$\Delta\hat{\theta} = \frac{1}{\kappa}[K(t_2) - K(t_1)] = \theta(t_2) - \theta(t_1) \quad (4)$$

Thus, the total angular rotation of the gyroscope is obtained from the measured quantities Gm $\{I_1, I_2, y_c, y_s\}$.

This case corresponds to the case of a perfect gyroscope and does not take into account backscattering from the components of the cavity. This measurement is limited. Specifically, it is known that, because of backscatter from the optical components forming the cavity, the two counter-propagating modes are (weakly) coupled, this causing the device's frequency to lock-in at low frequencies of rotation.

This effect creates a blind spot in which it is impossible to determine the velocity of rotation from the phase $\varphi$.

Taking into account backscattering, equation (1) becomes:

$$\dot{\varphi}(t) = \kappa\dot{\theta} + m\sin(\varphi + \xi) \quad (5)$$

where (m, $\xi$) are the amplitude and phase of the backscatter, respectively. This equation is called Adler's equation.

Figure 2:
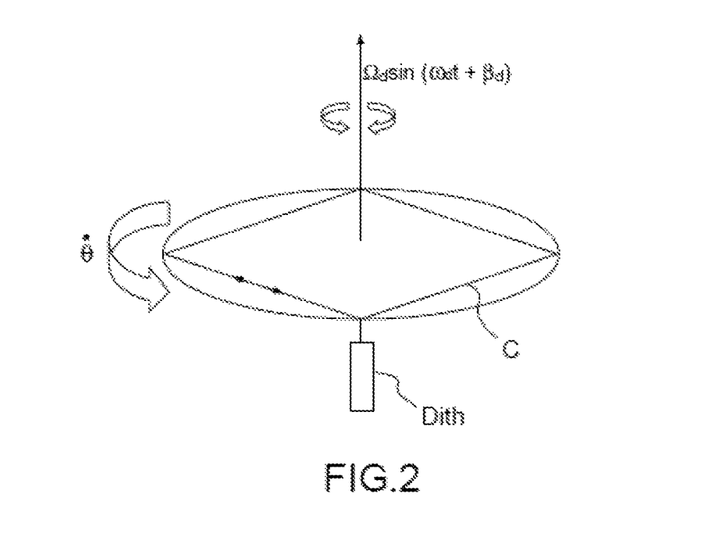
FIG. 2, which was mentioned above, illustrates the principle of mechanical dithering of a laser gyro.

One solution allowing the size of the blind spot to be decreased is to subject the laser cavity C of the laser gyro to mechanical dithering using a device Dith made up of piezo-electric ceramics that are activated by an electrical signal, such as illustrated in FIG. 2. The device Dith subjects the laser cavity to a slow high-amplitude oscillation. The gyroscope is therefore subjected not only to the rotation ($\dot{\theta}$) that the entire device experiences, but also to the rotation due to the mechanical dithering:

$$\dot{\theta}_d = A_d \sin(\omega_d t + \beta_d):$$

where $A_d$ is the amplitude, $\omega_d$ the angular frequency and $\beta_d$ the phase of the applied oscillation. Adler's equation then becomes:

$$\dot{\varphi}(t) = \kappa[\dot{\theta} + A_d\sin(\omega_d t + \beta_d)] + m\sin(\varphi + \xi) = \quad (6)$$
$$\kappa\dot{\theta} + \Omega_d\sin(\omega_d t + \beta_d) + m\sin(\varphi + \xi)$$

where $\Omega_d = \kappa A_d$ is the amplitude of the phase shift due to the mechanical dithering.

By virtue of the mechanical dithering, a phase $\varphi$ that is almost always outside of the blind spot of the gyroscope is obtained.

Then $\varphi$ is measured from the measured quantities Gm $\{I_1, I_2, y_c, y_s\}$ (Equation (3)) and $\Delta\theta$ is obtained by sampling the phase $\varphi$ every $$T_{\omega_d} = \frac{2\pi}{\omega_d}$$

in order not to measure the contribution of the mechanical dithering. Specifically:

$$\varphi(T_{\omega_d}) - \varphi(0) = \kappa[(T_{\omega_d}) - \theta(0)] + 0 + m[\sin(\varphi(T_{\omega_d}) + \xi) - \sin(\varphi(0) + \xi)]$$

and therefore:

$$\Delta\theta = \frac{1}{\kappa}\Delta\varphi - \frac{m}{\kappa}[\sin(\varphi(T_{\omega_d}) + \xi) - \sin(\varphi(0) + \xi)].$$

When $\kappa\dot\theta \gg m$ a good approximation of the angular increment is obtained:

$$\Delta\theta \approx \frac{1}{\kappa}\Delta\varphi$$

In the case where $\kappa\dot\theta \gg m$, it is possible to prove that below a certain $\kappa\dot\theta$ limit what is called a dynamic blind spot is entered and $\Delta\varphi=0$ is measured even if $\dot\theta\neq 0$. The backscattering-related terms compensate for the phase shift due to the rotation experienced by the gyroscope. Because of the existence of this residual dynamic blind spot, it would be advantageous to remove the effect of backscattering.

Because the intensities of the two counter-propagating modes (which up to now have been assumed to be constant) vary, the behaviour of the gyroscope subjected to mechanical dithering is described by Lamb's equations:

$$\dot I_1 = \frac{g_0}{1 + \frac{I_1}{I_s} + \frac{I_2}{I_c}} I_1 - \Gamma I_1 + 2m\sqrt{I_1 I_2} \cos(\varphi + \xi) \quad (7)$$

$$\dot I_2 = \frac{g_0}{1 + \frac{I_1}{I_c} + \frac{I_2}{I_s}} I_2 - \Gamma I_2 + 2m\sqrt{I_1 I_2} \cos(\varphi - \xi)$$

$$\dot\varphi = \Omega_d \sin(\omega_d t + \beta_d) + \kappa\dot\theta - m\sqrt{\frac{I_2}{I_1}}\sin(\varphi + \xi) - m\sqrt{\frac{I_1}{I_2}}\sin(\varphi - \xi)$$

where
$I_1$, $I_2$ are the intensities of the two counter-propagating modes;
$\varphi$ is the actual phase difference between the two modes;
m is the amplitude and $\xi$ the phase of the backscatter from the mirrors in the cavity;
$\Omega_d$ is the amplitude, $\omega_d$ the angular frequency and $\beta_d$ the phase of the mechanical dithering;
r is the loss and $g_0$ the gain of the cavity of the laser gyro, with $g_0 > r$;
$I_c$ is the cross-saturation intensity and $I_s$ the self-saturation intensity of the cavity, with $I_c \gg I_s$; and
$\dot\theta$ is the velocity of rotation of the gyroscope.

Generally, since the mirrors forming the cavity are of very high quality, they have low backscattering coefficients and:
m $\gg$ $g_0$-r.
All these parameters are considered to vary slowly.

For a "real" gyroscope in which the mirrors of the cavity backscatter, it is therefore necessary, to solve the system (7), to determine the backscattering coefficients (m, $\xi$).

Firstly, let us assume that the coefficients (m, $\xi$) have been determined (i.e. they are known).

Various filtering and correcting methods may be used to determine the velocity of rotation $\dot\kappa$ from Lamb's equations.

Figure 3:
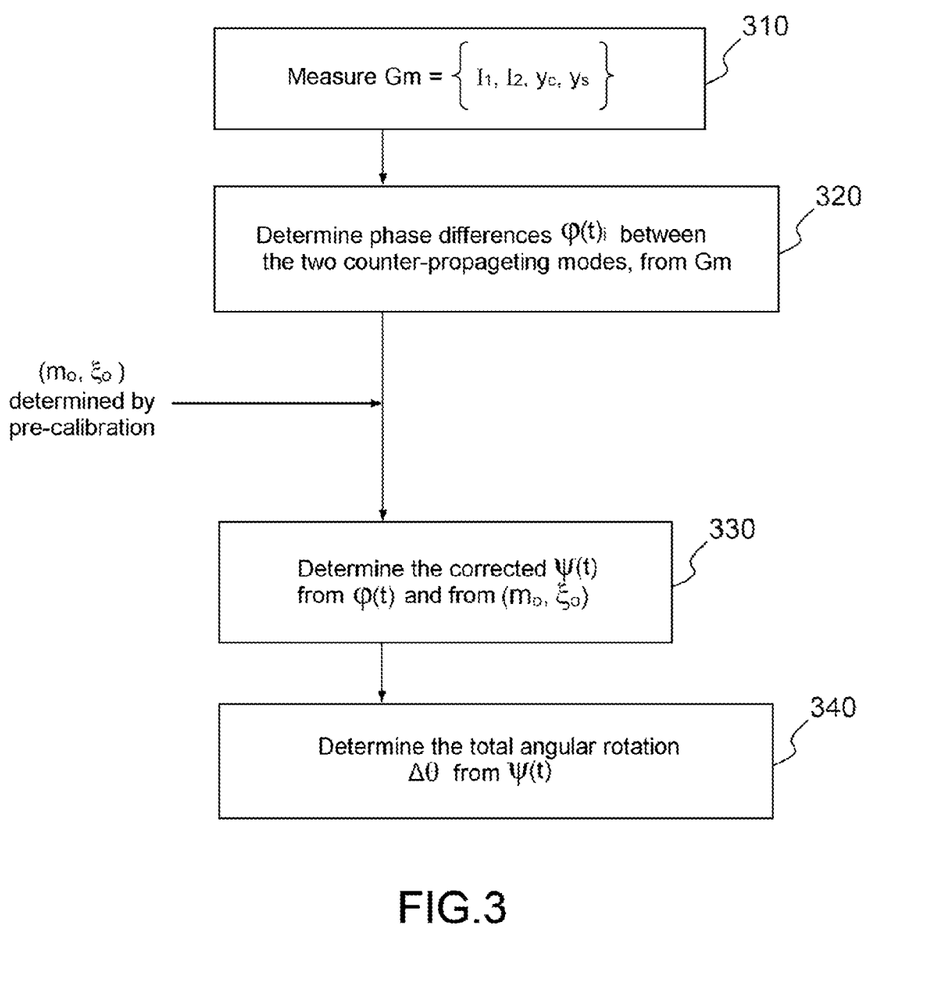
FIG. 3, which was mentioned above, shows a conventional method for determining the angular rotation of a gyroscope using an average value of the scattering coefficients, this average value being determined by pre-calibration.

An example 300 of such a method is illustrated in FIG. 3.

Optionally, the gyroscope is subjected to mechanical dithering.

In a step 310 the quantities Gm=$\{I_1, I_2, y_c, y_s\}$ are measured.

In a step 320 the phase $\varphi(t)$ is determined from the measured quantities Gm in a conventional way (see Formula 3).

Next, in step 330 a corrected phase $\psi$ cleaned of scattering effects is determined by subtracting the scattering component (m, $\xi$) (which is assumed known):

$$\Psi = \varphi(t) + \int_0^t m\left[\sqrt{\frac{I_1}{I_2}}\sin(\varphi + \xi) + \sqrt{\frac{I_2}{I_1}}\sin(\varphi - \xi)\right]d\tau \quad (8)$$

This new quantity respects:

$$\frac{d\Psi}{dt} = \kappa[\dot\theta + \dot\theta_d] \quad (9)$$

This equation corresponds to that of a perfect gyroscope.

In a step 340, a conventional method such as described above is applied to determine the total angular rotation $\Delta\Theta$ of the gyroscope.

A precalibration method that allows average values of the coefficients (m, $\xi$) to be measured by accumulation of measurement data over a relatively long length of time is described in the document "Online effective backscattering estimation for ring laser gyro" by Zhenfang Fan et al, Chinese Optics letters 10(5): 051404, 2012. Post-processing, these average values are denoted ($m_0$, $\xi_0$).

Initially, the gyroscope is operated for several hours in order to ensure the stability of the coefficients ($m_0$, $\xi_0$). Next, the intensities of the two counter-propagating modes ($I_1$, $I_2$) are measured and then their average and their difference computed.

$$I_A = \frac{1}{2}(I_1 + I_2)$$

$$i_A = \frac{1}{2}(I_1 - I_2).$$

The aforementioned document reports work that allowed the amplitude of the oscillations of these two quantities to be written as a function of $\kappa\dot\theta$. This dependency depends on (m, $\xi$). The method proposed in this document consists in measuring the amplitude of these oscillations for various known values of $\kappa\dot\theta$, then in performing what is called a "feat" using a Newton least-squares approach in order to find the coefficients ($m_0$, $\xi_0$). This method gives an average value of the scattering coefficients that does not take into account any drift in said value over time.

Based on this measurement technique, a number of documents, such as that by Zhenfang Fan, Hui Luo, Guangfeng Lu, and Shaomin Hu, "Dynamic lock-in compensation for mechanically dithered ring laser gyros", have proposed to correct the beat signals in order to remove the effect of backscattering therefrom, as described with reference to FIG. 3. It is thus possible to get close to the case of a perfect gyroscope and therefore to obtain a measurement of $\Delta\theta$.

However, as explained above, the measurements of $\Delta\theta$ in this case are based on predetermined values of the scattering coefficients that do not take into account any drift in the laser gyro as a function of time.

One aim of the present invention is to mitigate the aforementioned drawbacks by providing a method for estimating the scattering coefficients of a laser gyro during its operation, thereby allowing any drifts over time to be tracked.

SUMMARY OF THE INVENTION

One subject of the present invention is an iterative method for determining scattering coefficients of the cavity of a laser gyro in operation supporting two counter-propagating modes, comprising steps consisting in:

determining a set of variables dependent on characteristic physical quantities of the laser gyro, the characteristic physical quantities comprising a first and second light intensity corresponding to the first and second counter-propagating modes, respectively, and a phase difference between said modes, said variables being determined so that they are related to one another by at least two dependency relationships, modelling the behaviour of the laser gyro and using a plurality of coefficients, said coefficients depending on parameters of the laser cavity including said scattering coefficients, one reference variable per dependency relationship being selected from the variables;

measuring values of the characteristic physical quantities of the laser gyro in operation;

determining measured values of the variables, deduced from the measured values of the characteristic physical quantities;

estimating, via an iterative method, estimated values of the coefficients minimising a discrepancy between the measured values of the reference variables and estimated values of the reference variables, which are estimated from the values of the coefficients and the measured values of the variables other than the reference variables; and determining estimated values of the scattering coefficients from the estimated values of the coefficients.

Advantageously, the step of determining a set of variables comprises determining a first and second dependency relationship between the variables from Lamb's differential equations.

Advantageously, the step of determining a set of variables defines the following variables:

$$u = \frac{1}{2}(I_1 + I_2)$$

$$v = \frac{1}{2}(I_1 - I_2)$$

$$\dot{u} = \frac{du}{dt}$$

$$\dot{v} = \frac{dv}{dt}$$

$$\cos\varphi$$

$$\sin\varphi$$

where:

$I_1$, $I_2$ are the light intensities of the two counter-propagating modes; and $\cos\varphi$ and $\sin\varphi$ are respectively the cosine and sine of the phase difference between the two modes.

Advantageously, the first dependency relationship relates the variables u, $\dot{u}$ and $\cos\varphi$, referred to as the first set of variables, to one another, and the second dependency relationship relates the variables v, $\dot{v}$, and $\sin\varphi$, referred to as the second set of variables, to one another.

Preferably, the first and second dependency relationships are such that one variable of a set is equal to a linear combination of the other variables of the same set.

Preferably, $\dot{u}$ is selected as reference variable for the first dependency relationship and $\dot{v}$ is selected as reference variable in the second dependency relationship.

According to one variant, the phase difference between the two counter-propagating modes is determined from a first beat signal and a second beat signal in phase quadrature with the first beat signal.

Preferably, the cosine and sine of the phase difference are determined as follows:

$$\cos(\varphi) = \frac{y_c - I_1 - I_2}{2\sqrt{I_1 I_2}}$$

$$\sin(\varphi) = \frac{y_s - I_1 - I_2}{2\sqrt{I_1 I_2}}$$

where:

$I_1$, $I_2$ are the light intensities of the two counter-propagating modes;

yc is the first beat signal; and ys is the second beat signal in phase quadrature with yc.

According to one embodiment, the estimating step comprises sub-steps consisting in:

initialising the values of the coefficients;

determining, from the dependency relationships, estimated reference variables that are estimated from the values of the coefficients and from the measured values of the variables other than the reference variables;

determining discrepancies between the estimated reference variables and the measured reference variables;

on the basis of said discrepancies, estimating, using an iterative method, estimated values of the coefficients minimising said discrepancy.

According to one embodiment, the iterative method is a recursive least-squares method.

Advantageously, the measuring step is looped so as to determine estimated values of the scattering coefficients of the laser gyro in operation over time.

Advantageously, the method according to the invention furthermore comprises a step of determining an angular rotation of the laser gyro from the estimated values of the scattering coefficients.

According to another subject the invention also relates to a gyroscopic system comprising:

a laser gyro comprising a cavity supporting two counter-propagating modes;

measuring means that are configured to measure the values of characteristic physical quantities of the gyroscope in operation, comprising a first and second light intensity corresponding to the first and second counter-propagating modes, respectively, and a phase difference ($\varphi$) between said modes;

an estimator configured to determine estimated values of coefficients depending on parameters of the cavity of the gyroscope, the estimator being configured to:

determine a set of variables dependent on characteristic physical quantities of the laser gyro, said variables being determined so that they are related to one another by at least two dependency relationships modelling the behaviour of the laser gyro and using a plurality of coefficients, said coefficients depending on parameters of the laser cavity including said scattering coefficients, one reference variable per dependency relationship being selected from the variables, determine measured values of the variables, deduced from the measured values of the characteristic physical quantities, and estimate, via an iterative method, estimated values of the coefficients minimising a discrepancy between the measured values of the reference variables and estimated values of the reference variables, which are estimated from values of the coefficients and from the measured values of the variables other than the reference variables; and a computational module configured to determine estimated values of the scattering coefficients from the estimated values of the coefficients.

Advantageously, the computational module is furthermore configured to determine an angular rotation of the laser gyro from the estimated values of the scattering coefficients.

BRIEF DESCRIPTION OF THE DRAWINGS

Other features, aims and advantages of the present invention will become apparent on reading the following detailed description with reference to the appended drawings, which are given by way of nonlimiting example and in which.

DETAILED DESCRIPTION

Figure 4:
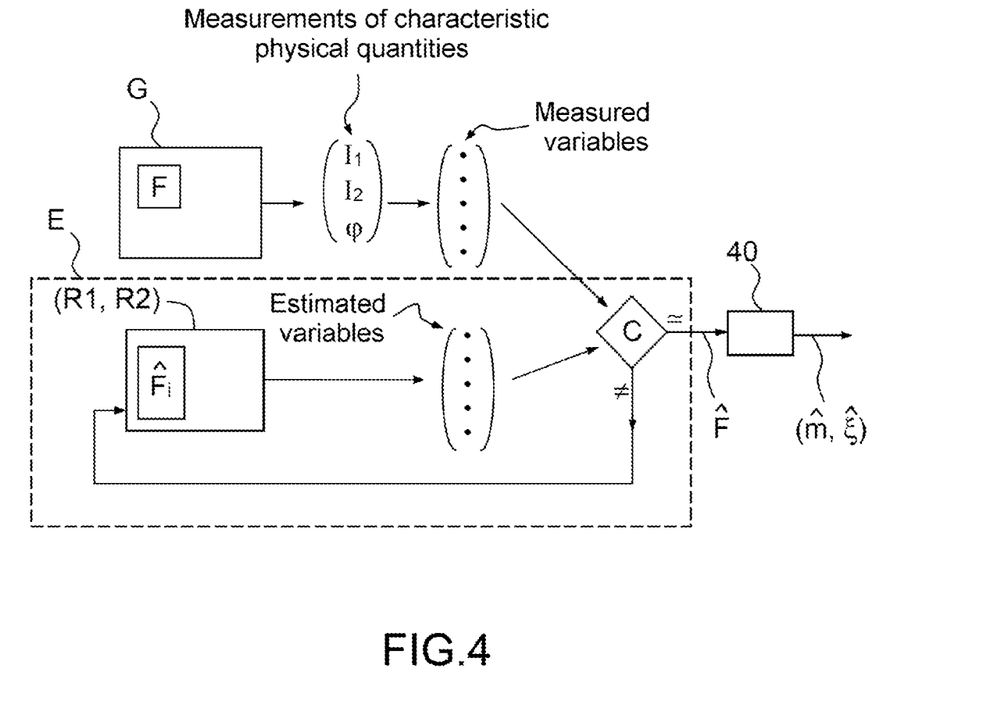
FIG. 4 describes the principle of the invention.

FIG. 4 gives a functional description of the principle of the method according to the invention. A laser gyro G comprises a laser cavity in which two counter-propagating modes propagate. The optical properties of this cavity, and more particularly the aforementioned scattering coefficients, have a tendency to change during the operation of the laser gyro. Since the value of these coefficients (m, $\xi$) is necessary to correct the value of the measured phase and to obtain a more accurate measurement, it is advantageous to measure the values of these coefficients in real time.

The letter F will be used to denote a series of parameters that, as is known, depend on properties of the laser cavity of the laser gyro G and that include the scattering coefficients. These characteristic physical quantities I1, I2 and the phase difference $\varphi$ of the laser gyro are measured in operation over a length of time that is short (typically shorter than a few seconds) but that also allows the value of any drift in the intensities I1 and I2 with respect to time to be measured.

The method uses an estimator E that reproduces the behaviour of the laser gyro. The physical quantities I1, I2 and $\varphi$ are transformed into a set of variables that depend on these three quantities. On the basis of the measurement of I1, I2 and $\varphi$, values of the variables, which will be called measured variables, are deduced. These measured variables are in fact obtained directly from the measurements carried out on the gyro, via a computation.

Moreover, the inventors have chosen the variables in a particular way that will be explained below, so that they are related to one another by dependency relationships obtained by adapting a mathematical model describing the behaviour of the laser gyro.

These dependency relationships contain the parameters F defined above, and it is thus possible to compute an estimated value of what is called a reference value, determined from the measured variables (obtained from the measured physical quantities) of the other variables on which it depends, and of values defined by the parameters F.

It is then possible to compare, for the reference variables, the measured value and the estimated value.

An iterative method (index i) using an estimator E optimises the parameters Fi, and determines the estimated parameters $\hat{F}$ that minimise the discrepancy between the measured and estimated value.

Since the parameters F depend on the scattering coefficients in a known way, the values of the scattering coefficients are obtained from the estimated value of the parameters via a simple computation 40.

It may be seen that with this method, if the estimator converges sufficiently rapidly, it is possible to obtain a real-time estimation of the scattering coefficients from measurements conventionally carried out on a laser gyro in operation.

Figure 5:
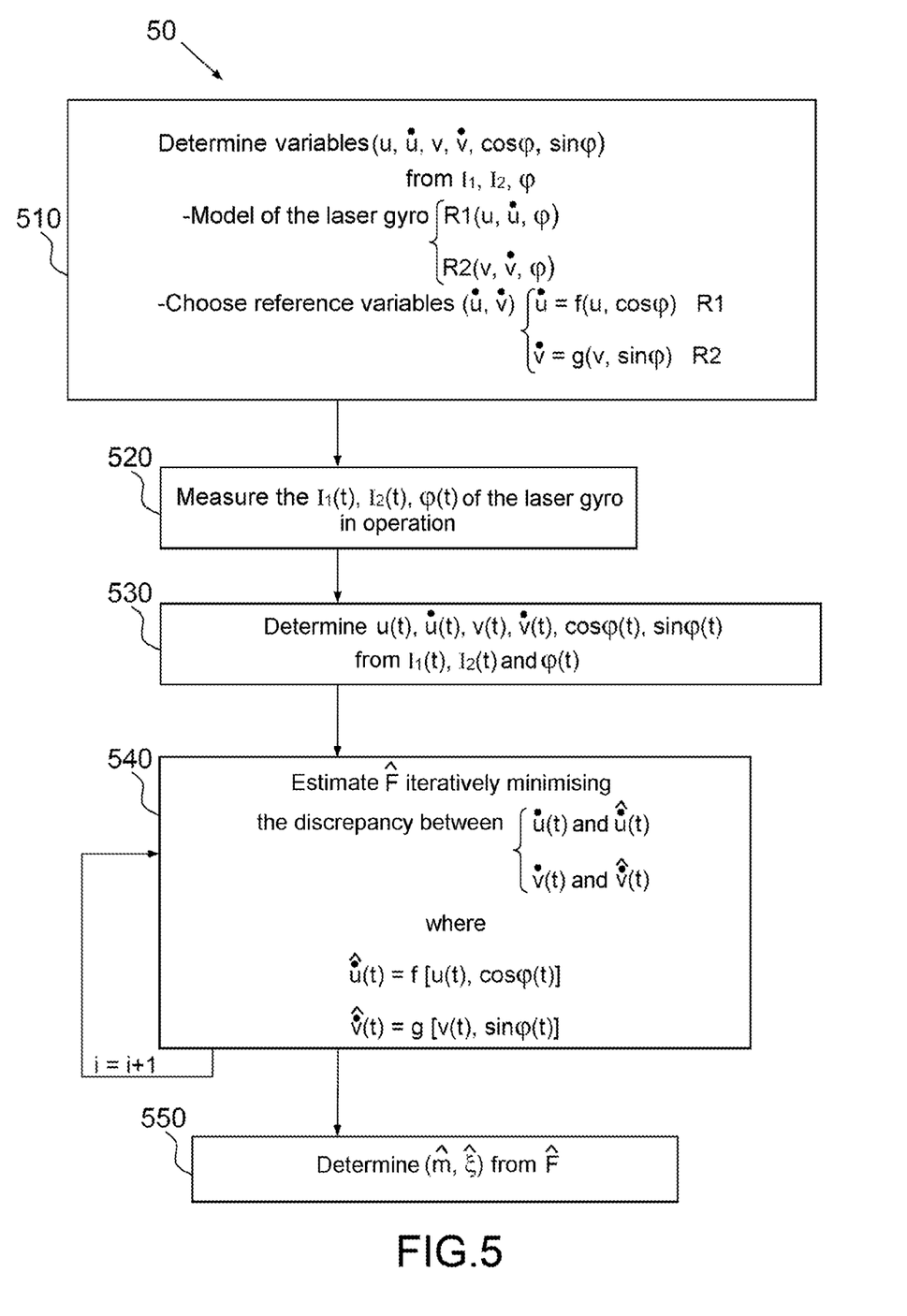
FIG. 5 describes the steps of the method according to the invention.

FIG. 5 describes the steps of the iterative method 50 for determining the scattering coefficients (m, $\xi$) of a laser gyro G in operation according to the invention.

After many calculations and great reflection, the inventors have found a set of variables deduced from characteristic physical quantities, and allowing an iterative estimating method to be implemented the functional principle of which is described in FIG. 4.

A first step 510 of the method therefore consists in determining a set of variables depending on characteristic physical quantities of the laser gyro G. The physical quantities used are known quantities that are conventionally measured as described in the prior art, namely the light intensities I1 and I2 corresponding to the first and second counter-propagating mode, respectively, and the phase difference $\varphi$ between these two modes.

According to one preferred nonlimiting embodiment, the set of variables comprises 5 variables defined as follows:

$$u = \frac{1}{2}(I_1 + I_2) \quad (10)$$

$$v = \frac{1}{2}(I_1 - I_2) \quad (11)$$

$$\dot{u} = \frac{du}{dt}$$

$$\dot{v} = \frac{dv}{dt}$$

$$\cos\varphi$$

$$\sin\varphi$$

The variables are defined on the basis of a model of the behaviour of the laser gyro, so that they are related to one another by at least two dependency relationships, a first relationship that will be called R1 and a second relationship that will be called R2, these relationships being deduced from a model of the behaviour of the laser gyro. These two equations establish a relationship between the variables using a plurality of coefficients F, these coefficients depending on parameters of the laser cavity including the scattering coefficients.

In the aforementioned example, the behaviour of the laser gyro is modelled using Lamb's differential equations (without linearisation of the gain) described in the prior art (Equations (7)):

$$\frac{dI_1}{dt} = \frac{g_0}{1 + \frac{I_1}{I_s} + \frac{I_2}{I_c}} I_1 - \Gamma I_1 + 2m\sqrt{I_1 I_2}\cos(\varphi + \xi)$$

$$\frac{dI_2}{dt} = \frac{g_0}{1 + \frac{I_2}{I_s} + \frac{I_1}{I_c}} I_2 - \Gamma I_2 + 2m\sqrt{I_1 I_2}\cos(\varphi - \xi)$$

where
$I_1$, $I_2$ are the intensities of the two counter-propagating modes;
$\varphi$ is the actual phase difference between the two modes;
m is the amplitude and $\xi$ the phase of the backscatter from the mirrors in the cavity;
r is the loss and $g_0$ the gain of the cavity of the laser gyro, with $g_0 > r$; and
$I_c$ is the cross-saturation intensity and $I_s$ the self-saturation intensity of the cavity, with $I_c \gg I_s$.

The variation of the variables (u, v) of the invention according to the example is modelled by the following equations, which are deduced from Lamb's equations:

$$\dot{u} = 2m\bar{I}\cos(\xi)\cos(\varphi) - \alpha u + \alpha\bar{I} \text{ corresponding to } R1(u, \dot{u}, \cos\varphi), \quad (12)$$

$$\dot{v} = -2m\bar{I}\sin(\xi)\sin(\varphi) - \alpha\frac{I_c - I_s}{I_c + I_s}v \text{ corresponding to } R2(v, \dot{v}, \sin\varphi), \quad (13)$$

where:

$$\bar{I} = \frac{I_c I_s}{I_c + I_s}\left(\frac{g_0}{\Gamma} - 1\right), \text{ and}$$

$$\alpha = \frac{\Gamma}{g_0}(g_0 - \Gamma)e$$

These constants $\alpha$ and $\bar{I}$ may be determined separately and are considered to be known.

Thus two dependency relationships are obtained, a first relationship R1 that relates the variables u, $\dot{u}$ and cos $\varphi$ to one another, which variables are called the first set of variables, and a second relationship R2 that relates the variables v, $\dot{v}$ and sin $\varphi$ to one another, which variables are called the second set of variables.

From the set of variables, one reference variable is selected per dependency relationship, these reference variables being those that will be used in the recursive optimisation computation.

By way of illustration, $\dot{u}$ has been selected as reference variable for the first dependency relationship and $\dot{v}$ as reference variable in the second dependency relationship. However, according to another example, (u,v) or (cos $\varphi$, sin $\varphi$) may be taken as reference variable. The estimator is applied in the same way.

The mathematical foundations on which the method according to the invention, which was developed by the inventors, is based have been presented. A particular choice of variables allows, via a transformation of Lamb's equations, an estimator to be used in an original way to relate laser gyro parameters directly to the scattering coefficients.

A step 520 measures, with conventional means, the values of the characteristic physical quantities I1,I2, $\varphi$ of the laser gyro in operation and over a sufficient length of time to allow the drift of I1 and I2 with respect to time to be determined. For example, the drift is filtered, and therefore typically a few microseconds are necessary (the passband of the filter is at 150 kHz).

For example, the phase $\varphi$ is determined from the measurement of the intensities and of the beat signals yc and ys defined above:

$$\cos(\varphi) = \frac{y_c - I_1 - I_2}{2\sqrt{I_1 I_2}} \quad (14)$$

$$\sin(\varphi) = \frac{y_s - I_1 - I_2}{2\sqrt{I_1 I_2}} \quad (15)$$

In this case, the physical quantities measured in step 520 are I1, I2, yc and ys.

However, other means for measuring the phase $\varphi$ may be used.

Next, in a step 530, measured values of the variables, deduced from the measured values of the characteristic physical quantities, are determined.

From the I1, I2 and $\varphi$ measured from the laser gyro in operation, the following are deduced:
the values of u and v from relationships (12) and (13);
the values of $\dot{u}$ and $\dot{v}$ from the measurement of I1(t) and I(2(t), over a sufficient time to measure the drifts $\dot{I}1$ and $\dot{I}2$; and
the values of cos $\varphi$ and sin $\varphi$ from the measurement of the phase $\varphi$. When the beats ys and yc are measured, cos $\varphi$ and sin $\varphi$ are deduced from Formulae (14) and (15).

In order not to clutter the mathematical formulae, the values of the variables deduced from the measured values of the physical quantities have not been given any particular indices. They are called measured values, in order to differentiate them from the estimated values described below.

The following step 540 estimates, via an iterative method, estimated values of the coefficients $\hat{F}$ minimising a discrepancy between the measured values $\dot{u}$, $\dot{v}$ of the reference variables, on the one hand, and estimated values $\hat{\dot{u}}$, $\hat{\dot{v}}$ of the reference variables, on the other hand, this estimation being performed on the basis of the values of the coefficients Fi (the index i describing one iteration of the method) and of the measured values of the variables u, cos φ v, sin φ other than the reference variables.

Returning to our example, the values of $\hat{\dot{u}}$, $\hat{\dot{v}}$ are obtained from Equations (12) and (13), which are rewritten in the form:

R1

$$\hat{\dot{u}} = k_1 \cdot \cos(\varphi) + k_2 \cdot u + k_3 \cdot 1 \qquad (16)$$

R2

$$\hat{\dot{v}} = k_4 \cdot \sin(\varphi) + k_5 \cdot v \qquad (17)$$

The plurality of coefficients denoted F comprises 5 coefficients:

$$F(k_1, k_2, k_3, k_4, k_5):$$

where:

$$\left. \begin{array}{l} k_1 = 2m\bar{l}\cos(\xi) \\ k_2 = -\alpha \\ k_3 = \alpha\bar{l} \\ k_4 = -2m\bar{l}\sin(\xi) \\ k_5 = -\alpha \dfrac{I_c - I_s}{I_c + I_s} \end{array} \right\} \qquad (18)$$

It may be seen that, in the example, the dependency relationships are such that one variable of a set, here $\hat{\dot{u}}$ or $\hat{\dot{v}}$, is equal to a linear combination of the other variables of the same set.

This property allows a plurality of types of estimator that will converge rapidly to be used.

Typically, the estimating step comprises a substep of initialising the value of F. It is possible to initialise with any value of F (of the coefficients k in the example), the estimator will converge naturally to the optimal values.

Next, in each iteration i, $\hat{\dot{u}}$ is determined from the measured u and cos φ and from the values $k_1(i), k_2(i), k_3(i)$ using the dependency relationship R1 (Equation (16)) and $\hat{\dot{v}}$ Is determined from the measured v and sin φ and from the values $k_4(i), k_5(i)$ using the dependency relationship R2 (Equation (17)).

Next the discrepancies $e1 = \hat{\dot{u}} - \dot{u}$ and $e2 = \hat{\dot{v}} - \dot{v}$ are computed.

The iterative method uses an estimator that will seek the estimated values of $\hat{F}$ i.e. the estimated values $\widehat{k1}$, $\widehat{k2}$, $\widehat{k3}$, $\widehat{k4}$, $\widehat{k5}$ of the coefficients, that minimise these two discrepancies $(\hat{\dot{u}} - \dot{u})$ and $(\hat{\dot{v}} - \dot{v})$. An exemplary implementation of the estimator according to the invention will be described below.

Thus, in each iteration an estimated value of a reference variable is compared with a measured value of the same reference variable, which value is obtained directly from the measured physical quantities of the laser gyro. The coefficients F are modified in each iteration provided that the result of the comparison is not zero or is not minimal.

Once the estimated values of the coefficients $\hat{F}$ have been determined, estimated values of the scattering coefficients $\hat{m}, \hat{\xi}$ are determined, in a step 550, from the estimated values $\hat{F}$ of the coefficients.

In our example $\hat{m}$ and $\hat{\xi}$ are obtained using formulae deduced from Formulae (18):

$$\left. \begin{array}{l} \alpha = -\hat{k}_2 \\ \bar{l} = \dfrac{\hat{k}_3}{\alpha} \\ m = \dfrac{1}{2\bar{l}} \text{abs}(\hat{k}_1 + i.\hat{k}_4) \\ \varphi = \arg(\hat{k}_1 + i.\hat{k}_4) \end{array} \right\} \qquad (19)$$

The method 50 according to the invention therefore allows, using an iterative real-time method, "instantaneous" values of the scattering coefficients to be computed. This technique has the advantage of being rapid and reliable, and may be adapted to existing laser gyros in which measurements of I1, I2 and φ are already taken.

Figure 6:
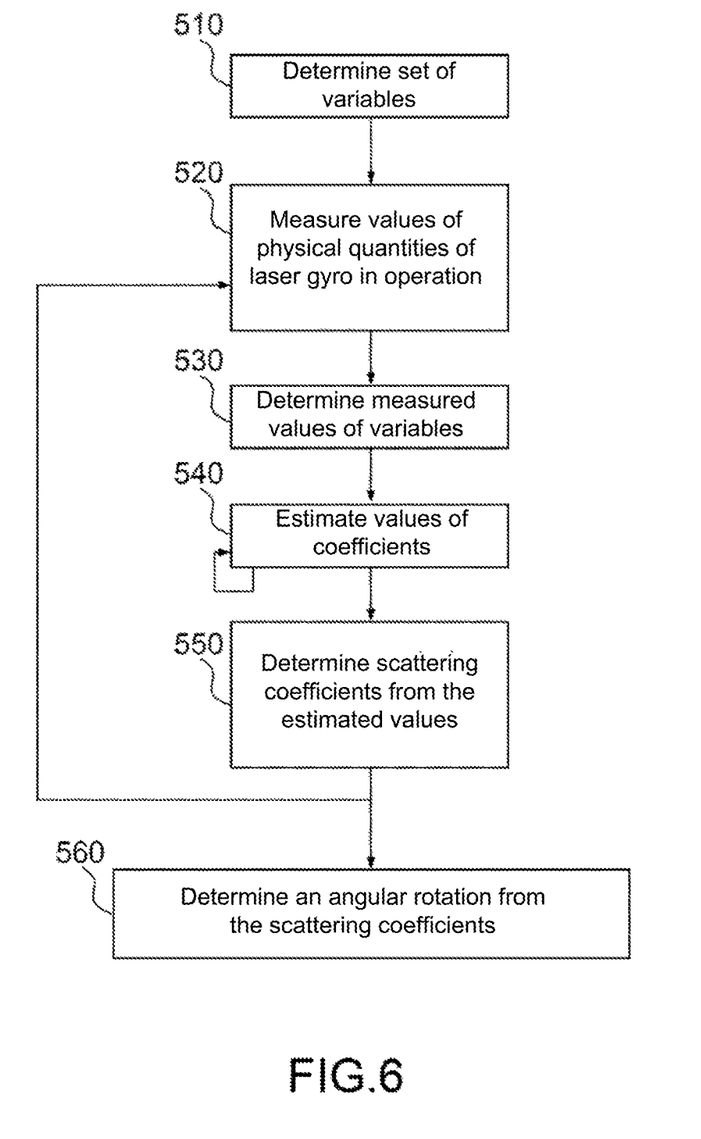
FIG. 6 describes a preferred embodiment of the method according to the invention, in which embodiment, as soon as the estimator has converged, the measuring step is repeated.

According to one preferred embodiment illustrated in FIG. 6, as soon as the estimator has converged, the measuring step 520 is repeated so as to determine estimated values of the scattering coefficients of the laser gyro G in operation over time. It is thus possible to track in real-time the instantaneous value of the amplitude and of the phase of the backscatter, i.e. the quality of the mirrors, thereby allowing characterisation of gyroscopes and the step of aligning the mirrors to be simplified.

According to another embodiment, the method 50 is carried out periodically, at intervals that may optionally be regularly spaced in time.

According to another preferred embodiment, also illustrated in FIG. 6, the method 50 according to the invention furthermore comprises a step 560 of determining an angular rotation ΔΘ of the laser gyro G from the estimated values of the scattering coefficients $\hat{m}, \hat{\xi}$, this determining step being carried out in a conventional way as described in the prior art.

The measurement of the rotation is then obtained from a corrected phase using the estimated scattering coefficients determined in steps 520 to 550 at the moment when the rotation information is desired, the scattering parameters corresponding to the current state of the laser gyro.

The "real-time" character of the measurement of ΔΘ is obtained when the estimator converges sufficiently rapidly to a single, coefficients solution.

Figure 7A:
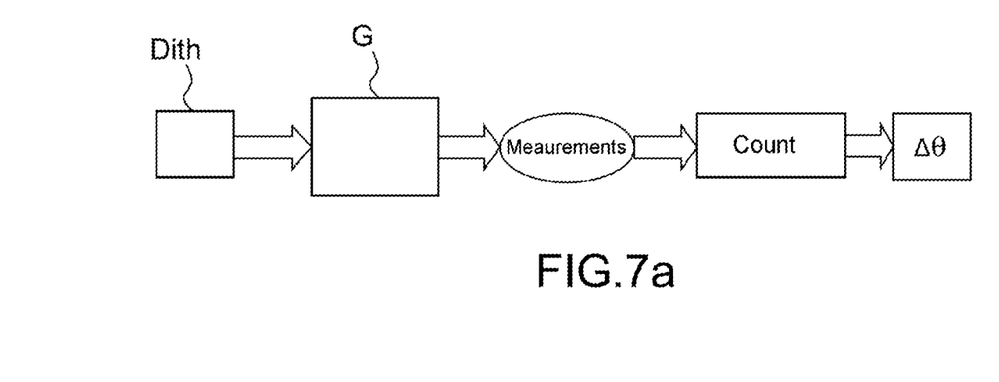
FIG. 7a describes a measurement chain with a laser gyro according to the prior art and FIG. 7b illustrates the ability of the method according to the invention to be inserted into the chain of FIG. 7a without substantial modification to said chain.
Figure 7B:
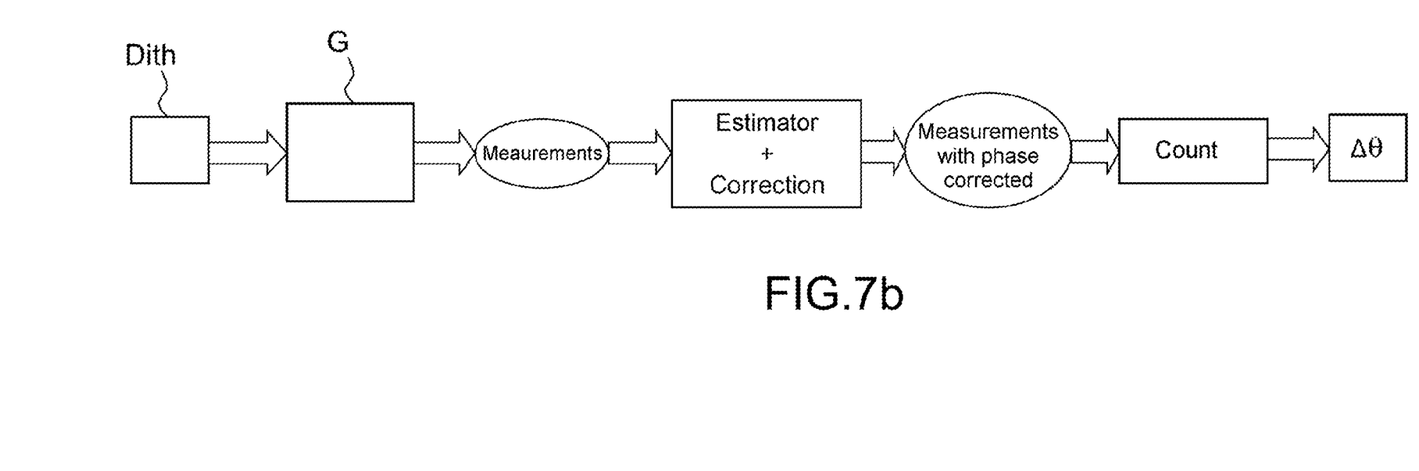

One advantage of the method according to the invention is that it may be implemented in an existing system. FIG. 7a illustrates a measurement chain according to the prior art. From conventional measurements carried out on the laser gyro, as explained in the prior art, a measurement of the angular rotation ΔΘ is obtained. FIG. 7b schematically illustrates the implementation of the method according to the invention in the conventional chain. The estimated scattering coefficients serve to correct the phase, which is then processed conventionally to obtain the angular rotation.

In summary, the method 50 according to the invention consists in duplicating the system composed of the laser gyro in operation using reformulated differential equations, the various parameters of this duplicate, which is called the estimator, being accessible via measurement. The same input that is received by the system, i.e. a plurality of parameters related to the optical properties of the cavity, is fed to the estimator and the outputs of these two systems are compared. As long as they are not identical, the parameters (the coefficients F) of the estimator are modified in real-time. Once the two outputs are identical, it is enough to read the parameters of the estimator in order to obtain those of the physical system, i.e. of the laser gyro in operation.

The whole point of the estimator is to find the way in which the parameters of the estimator (the coefficients F) must be modified in real-time in order to correspond to those of the physical system.

The dynamic behaviour of the estimator may be compared to that of a physical system possessing a single point of stable equilibrium, a pendulum for example. This point of equilibrium corresponding to the set of unknown coefficients of the gyroscope.

Having no a priori knowledge of this set of parameters, the estimator is initialised to 0, but any initialisation value may be used. Just like a pendulum, the estimator converges to its equilibrium position.

The advantage of using an estimator in the method according to the invention is that the estimator will find its point of equilibrium even if the latter changes, thus allowing the variation in the parameters of the gyroscope to be tracked in real-time even if they are not constant.

We will now describe in more detail the operation of the estimator.

Estimation theory introduces the concept of observability, which consists in ensuring that the set of parameters found is unique and therefore indeed corresponds to the physical system. It has been demonstrated that the set of parameters is unique for a dithered laser gyro, and, thus, when the method according to the invention is implemented on a laser gyro in operation, the latter will preferably be mechanically dithered.

The equation describing the variation of the variables (u, v) defined above may be rewritten:

$$\dot{u} = F_1^T M_1$$
$$\dot{v} = F_2^T M_2$$

where:

$$F_1 = \begin{pmatrix} k_1 \\ k_2 \\ k_3 \end{pmatrix}$$

$$M_1 = \begin{pmatrix} \cos(\varphi) \\ u \\ 1 \end{pmatrix}$$

and $$F_2 = \begin{pmatrix} k_4 \\ k_5 \end{pmatrix}$$

$$M_1 = \begin{pmatrix} \sin(\varphi) \\ v \end{pmatrix}$$

Therefore, it is the constants ($k_1$, $k_2$, $k_3$, $k_4$, $k_5$) that are to be estimated.

($\dot{u}$, $\dot{v}$) are chosen as the "reference variables" of the set of variables $\{u, \dot{u}, v, \dot{v}, \cos(\varphi), \sin(\omega), 1\}$ corresponding to the transformed measurements. Furthermore:

$$\hat{F}_1 = \begin{pmatrix} \hat{k}_1 \\ \hat{k}_2 \\ \hat{k}_3 \end{pmatrix} \text{ and}$$

$$\hat{F}_2 = \begin{pmatrix} \hat{k}_4 \\ \hat{k}_5 \end{pmatrix}.$$

By way of example, we will describe the operation of a recursive least-squares estimator, but the method according to the invention may employ other types of estimators, such as a Kalman estimator or an estimator using a Lyapunov function, etc.

The rate of convergence of the estimator is a setup parameter. In practice, estimators differ in their robustness (i.e. its sensitivity to noise). The rate of convergence is above all chosen with respect to the level of noise (the faster the estimator, the more sensitive it is to noise). Therefore, case-by-case, depending on the quality of the measurements (noisy or not) and on the desired sensitivity of the estimator to any distortion of the signals, one estimator rather than another will be chosen.

The recursive least-squares estimator is given by the following equations (without filtering for the sake of simplicity):

The errors between the measured values of the reference variable reference measurements and their estimated values are given by:

$$e_1 = \dot{u} - \hat{F}_1^T M_1 = \dot{u} - \hat{\dot{u}} \text{ and}$$

$$e_2 = \dot{v} - \hat{F}_2^T M_2 = \dot{v} - \hat{\dot{v}}$$

and the updated estimation of the parameters by:

$$\frac{d\hat{F}_1}{dt} = P_1 . M_1 . e_1 \text{ and}$$

$$\frac{d\hat{F}_2}{dt} = P_2 . M_2 . e_2.$$

Thus, $$\frac{d\hat{F}_1}{dt} = \frac{d\hat{F}_2}{dt} = 0 \text{ if } e_1 = e_2 = 0.$$

The variation in the estimation of the parameters $$\left( \frac{d\hat{F}_1}{dt}, \frac{d\hat{F}_2}{dt} \right)$$

is proportional to the error ($e_1$, $e_2$). If the error is zero the estimation no longer varies.

The matrices ($P_1$, $P_2$) are computational intermediates (close to the covariance matrices of the measurements $M_1$, $M_2$).

$$\frac{dP_1}{dt} = K_1 . P_1 - P_1 . (M_1 . M_1^T) . P_1$$

$$\frac{dP_2}{dt} = K_2 . P_2 - P_2 . (M_2 . M_2^T) . P_2$$

These equations are obtained from minimisation of the least-squares criterion:

$$V(M) = \int_0^t e^{-\alpha(t-\tau)} (y_{ref} - M^T F)^2 d\tau$$

The covariance matrices of the two equations are:

$$R_1(t) = P_1^{-1}(t) = \int_0^t e^{-\alpha(t-\tau)} M_1 \cdot M_1^T d\tau$$

$$R_2(t) = P_2^{-1}(t) = \int_0^t e^{-\alpha(t-\tau)} M_2 \cdot M_2^T d\tau$$

where $(K_1, K_2)$ are constants that determine the dynamic response of the estimator.

The estimator reiterates via the computation of the error. In each iteration the next update of the coefficients is proportional to the current error.

The rate of convergence is given by the coefficient K $(K_1, K_2)$ of the estimator, and is determined depending on the noise in the measurements and on the desired passband. The faster the estimator (i.e. the wider its passband) the more sensitive it is to noise.

Figure 8:
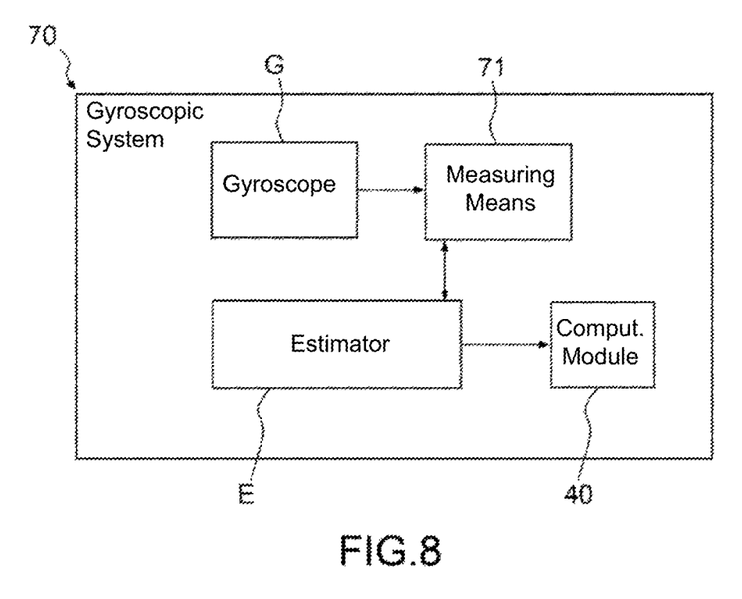
FIG. 8 illustrates a gyroscopic system according to the invention.

According to another aspect, the invention relates to a gyroscopic system 70, such as illustrated in FIG. 8, that comprises a laser gyro G comprising a cavity supporting two counter-propagating modes, and measuring means 71 configured to measure values of characteristic physical quantities of the gyroscope in operation. These physical quantities include a first light intensity I1 and a second light intensity I2 corresponding to the first and second counter-propagating mode, respectively, and the phase difference φ between the modes. These measuring means are conventionally for example photodetectors for the intensities, and an interferometer for the beat signals that allow the phase φ to be determined.

The gyroscopic system 70 furthermore comprises an estimator E configured to determine estimated values of coefficients depending on parameters of the cavity of the gyroscope, the estimator being configured to:

determine a set of variables, for example u, u̇, v, v̇, cos ω, sin ω, dependent on characteristic physical quantities of the laser gyro G, the variables being determined so that they are related to one another by at least two dependency relationships, a first relationship R1, for example between (u, u̇, cos φ), and a second relationship R2, for example between (v, v̇, sin φ), modelling the behaviour of the laser gyro and using a plurality of coefficients F, the coefficients depending on parameters of the laser cavity including the scattering coefficients, one reference variable per dependency relationship being selected from the variables, for example u̇ for R1 and v̇ for R2, determine measured values of the variables, deduced from the measured values of the characteristic physical quantities, and estimate, via an iterative method, estimated values of the coefficients F̂ minimising a discrepancy between the measured values (u̇, v̇) of the reference variables and estimated values (û̇, v̂̇) of the reference variables, which are estimated from values of the coefficients and the measured values of the variables other than the reference variables, for example u, cos φ v, sin φ when u̇ and v̇ are selected as reference variables.

Lastly, the system 70 comprises a computational module 40 configured to determine estimated values of the scattering coefficients m̂, ξ̂ from the estimated values F̂ of the coefficients.

Advantageously, the gyroscopic system 70 is furthermore configured to determine an angular rotation ΔΘ of the laser gyro G from the estimated values of the scattering coefficients m̂ and ξ̂.

The method according to the invention and the associated gyroscopic system may be applied to any type of laser gyro, such as gas laser gyros or solid-state laser gyros.

The invention claimed is:

1. A method of determining an angular rotation (Δθ) of a laser gyro in operation, the method comprising:
implementing a real time iterative method for determining scattering coefficients (m, ξ) of the cavity of a laser gyro in operation supporting two counter-propagating modes, comprising steps of:
determining a set of variables dependent on characteristic physical quantities of the laser gyro,
the characteristic physical quantities comprising a first and second light intensity corresponding to the first and second counter-propagating modes, respectively, and a phase difference (φ) between said modes,
said variables being determined so that they are related to one another by at least a first and a second dependency relationships (R1 (u, u̇, cos φ), R2 (v, v̇, sin φ)) modelling the behaviour of the laser gyro and using a plurality of coefficients, said coefficients depending on parameters of the laser cavity including said scattering coefficients, the first dependency relationship relating variables, referred to as the first set of variables, to one another, and the second dependency relationship relating variables, referred to as the second set of variables, to one another, the first and second dependency relationships being such that one variable of a set is equal to a linear combination of the other variables of the same set;
one reference variable (u̇, v̇) per dependency relationship being selected from the variables;
measuring values of the characteristic physical quantities of the laser gyro in operation;
determining measured values of the variables, deduced from the measured values of the characteristic physical quantities and from the first and second dependency relationships;
estimating, via an iterative method, estimated values of the coefficients (F̂) minimising a discrepancy between the measured values (u̇, v̇) of the reference variables and estimated values (û̇, v̂̇) of the reference variables, which are estimated from the values of the coefficients, the measured values of the variables (u, cos φ v, sin φ) other than the reference variables and from the first and second dependency relationships;
determining estimated values of the scattering coefficients (m̂, ξ̂) from the estimated values (F̂) of the coefficients; and
determining the angular rotation (Δθ) of the laser gyro from the estimated values of the scattering coefficients (m̂, ξ̂).

2. The method according to claim 1, wherein the step of determining a set of variables comprises determining the first and the second dependency relationships between the variables from Lamb's differential equations.

3. The method according to claim 1, wherein the step of determining a set of variables defines the following variables:

$$u = \frac{1}{2}(I_1 + I_2)$$

$$v = \frac{1}{2}(I_1 - I_2)$$

-continued $$\dot{u} = \frac{du}{dt}$$

$$\dot{v} = \frac{dv}{dt}$$

$$\cos\varphi$$

$$\sin\varphi$$

where:
$I_1$, $I_2$ are the light intensities of the two counter-propagating modes; and $\cos\varphi$ and $\sin\varphi$ are respectively the cosine and sine of the phase difference between the two modes.

4. The method according to claim 3, wherein the first dependency relationship $R1(u, \dot{u}, \cos\varphi)$ relates the variables $u$, $\dot{u}$ and $\cos\varphi$, to one another, and the second dependency relationship $R2(v, \dot{v}, \sin\varphi)$ relates the variables $v$, $\dot{v}$, and $\sin\varphi$, to one another.

5. The method according to claim 3, wherein $\dot{u}$ is selected as reference variable for the first dependency relationship and $\dot{v}$ is selected as reference variable in the second dependency relationship.

6. The method according to claim 1, wherein the phase difference ($\varphi$) between the two counter-propagating modes is determined from a first beat signal (yc) and a second beat signal (ys) in phase quadrature with the first beat signal.

7. The method according to claim 6, wherein the cosine and sine of the phase difference ($\varphi$) are determined as follows:

$$\cos(\varphi) = \frac{y_c - I_1 - I_2}{2\sqrt{I_1 I_2}}$$

$$\sin(\varphi) = \frac{y_s - I_1 - I_2}{2\sqrt{I_1 I_2}}$$

where:
$I_1$, $I_2$ are the light intensities of the two counter-propagating modes;
yc is the first beat signal; and
ys is the second beat signal in phase quadrature with yc.

8. The method according to claim 1, wherein the estimating step comprises sub-steps of:
initialising the values of the coefficients;
determining, from the dependency relationships, estimated reference variables ($\hat{\dot{u}}$, $\hat{\dot{v}}$) that are estimated from the values of the coefficients and from the measured values of the variables other than the reference variables;
determining discrepancies (($\hat{\dot{u}}-\dot{u}$), ($\hat{\dot{v}}-\dot{v}$)) between the estimated reference variables and the measured reference variables;
on the basis of said discrepancies (($\hat{\dot{u}}-\dot{u}$), ($\hat{\dot{v}}-\dot{v}$)), estimating, using an iterative method, estimated values of the coefficients ($\hat{F}$) minimising said discrepancy.

9. The method according to claim 1, wherein the iterative method is a recursive least-squares method.

10. The method according to claim 1, wherein the measuring step is looped so as to determine estimated values of the scattering coefficients of the laser gyro in operation over time.

11. A gyroscopic system comprising:
a laser gyro comprising a cavity supporting two counter-propagating modes;
measuring means that are configured to measure the values of characteristic physical quantities of the gyroscope in operation, comprising a first and second light intensity corresponding to the first and second counter-propagating modes, respectively, and a phase difference between said modes;
an estimator configured to determine estimated values of coefficients depending on parameters of the cavity of the gyroscope, the estimator being configured to:
determine a set of variables dependent on characteristic physical quantities of the laser gyro, said variables being determined so that they are related to one another by at least a first and a second dependency relationships ($R1(u, \dot{u}, \cos\varphi)$, $R2(v, \dot{v}, \sin\varphi)$) modelling the behaviour of the laser gyro and using a plurality of coefficients, said coefficients depending on parameters of the laser cavity including said scattering coefficients, the first dependency relationship relating variables, referred to as the first set of variables, to one another, and the second dependency relationship relating variables, referred to as the second set of variables, to one another, the first and second dependency relationships being such that one variable of a set is equal to a linear combination of the other variables of the same set, one reference variable ($\dot{u}$, $\dot{v}$) per dependency relationship being selected from the variables;
determine measured values of the variables, deduced from the measured values of the characteristic physical quantities, and
estimate, via an iterative method in real time during operation, estimated values of the coefficients ($\hat{F}$) minimising a discrepancy between the measured values ($\dot{u}$, $\dot{v}$) of the reference variables and estimated values ($\hat{\dot{u}}$, $\hat{\dot{v}}$) of the reference variables, which are estimated from values of the coefficients and from the measured values of the variables (u, $\cos\varphi$v, $\sin\varphi$) other than the reference variables; and
a computational module configured to determine estimated values of the scattering coefficients ($\hat{m}$, $\hat{\xi}$) from the estimated values ($\hat{F}$) of the coefficients and to determine an angular rotation ($\Delta\theta$) of the laser gyro from the estimated values of the scattering coefficients ($\hat{m}$, $\hat{\xi}$).

* * * * *

UNITED STATES PATENT AND TRADEMARK OFFICE
CERTIFICATE OF CORRECTION

| | |
|---|---|
| PATENT NO. | : 10,859,378 B2 |
| APPLICATION NO. | : 15/453818 |
| DATED | : December 8, 2020 |
| INVENTOR(S) | : Noad Hamze El Badaoui |

It is certified that error appears in the above-identified patent and that said Letters Patent is hereby corrected as shown below:

In the Claims

In Claim 1, Column 16, Line 43, "values $(\overset{\cdot}{\hat{u}}, \hat{v})$ of the reference variables," should be -- values $(\hat{\overset{\cdot}{u}}, \hat{v})$ of the reference variables, --.

In Claim 8, Column 17, Line 46, "estimated reference variables $(\overset{\cdot}{\hat{u}}, \hat{v})$" should be -- estimated reference variables $(\hat{\overset{\cdot}{u}}, \hat{v})$ --.

In Claim 8, Column 17, Line 50, "determining discrepancies $((\overset{\cdot}{\hat{u}} - \dot{u}), (\hat{v}-\dot{v}))$ between" should be -- determining discrepancies $((\hat{\overset{\cdot}{u}} - \dot{u}), (\hat{v} - \dot{v}))$ between --.

In Claim 8, Column 17, Line 53, "on the basis of said discrepancies $((\overset{\cdot}{\hat{u}} - \dot{u}), (\hat{v} - \dot{v}))$," should be -- on the basis of said discrepancies $((\hat{\overset{\cdot}{u}} - \dot{u}), (\hat{v} - \dot{v}))$ --.

In Claim 11, Column 18, Line 46, "and estimated values $(\overset{\cdot}{\hat{u}}, \hat{v})$ of the reference variables," should be -- and estimated values $(\hat{\overset{\cdot}{u}}, \hat{v})$, of the reference variables, --.

Signed and Sealed this
Twenty-seventh Day of April, 2021

Drew Hirshfeld
*Performing the Functions and Duties of the
Under Secretary of Commerce for Intellectual Property and
Director of the United States Patent and Trademark Office*